March 19, 1968  D. N. BLOSSER  3,373,723
INTERNAL COMBUSTION ENGINE
Filed Aug. 1, 1966  6 Sheets-Sheet 1

INVENTOR.
DONALD N. BLOSSER
BY
*Allen and Allen*
ATTORNEYS

March 19, 1968

D. N. BLOSSER 3,373,723

INTERNAL COMBUSTION ENGINE

Filed Aug. 1, 1966

INVENTOR.
DONALD N. BLOSSER

BY *Allen and Uromy*

ATTORNEYS

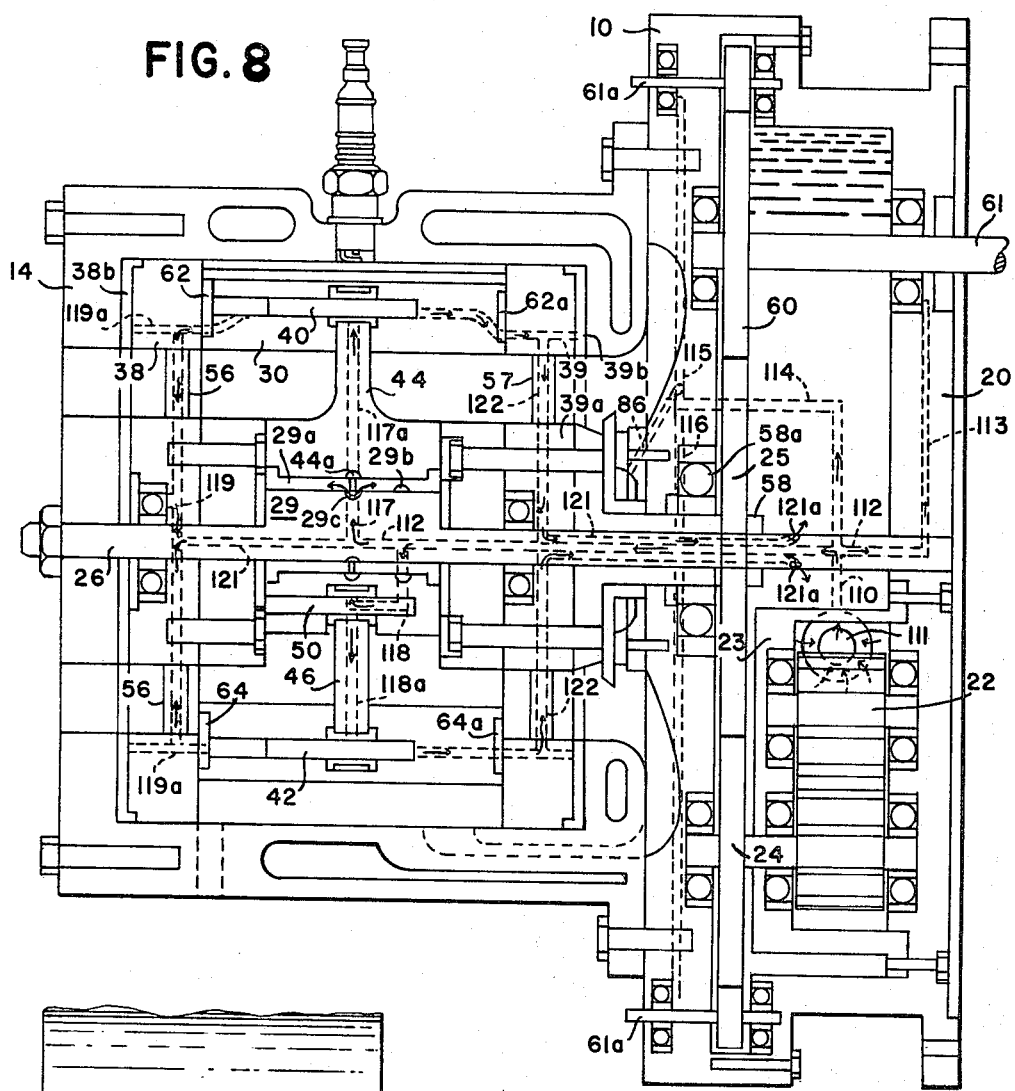

March 19, 1968  D. N. BLOSSER  3,373,723

INTERNAL COMBUSTION ENGINE

Filed Aug. 1, 1966  6 Sheets-Sheet 5

INVENTOR.
DONALD N. BLOSSER
BY
ATTORNEYS

March 19, 1968

D. N. BLOSSER 3,373,723

INTERNAL COMBUSTION ENGINE

Filed Aug. 1, 1966

INVENTOR.
DONALD N. BLOSSER

BY

ATTORNEYS

United States Patent Office 3,373,723
Patented Mar. 19, 1968

3,373,723
INTERNAL COMBUSTION ENGINE
Donald N. Blosser, 1328 Petal Way,
San Jose, Calif. 95129
Filed Aug. 1, 1966, Ser. No. 569,203
6 Claims. (Cl. 123—17)

ABSTRACT OF THE DISCLOSURE

An internal combustion engine provided with a plurality of swinging pistons mounted on pivots in a rotatable piston carrier which has a hollow air passage therethrough for receiving air at one end and means to compress it at the other end. A fixed shaft attached to the end plates of the engine housing provided with an eccentric fixedly attached thereto. A hollow member is mounted on the eccentric, said hollow member being attached to the piston rods. A hollow power takeoff shaft rotatably supported on the fixed shaft and fixedly connected to the piston. Fuel is fed to the aforesaid other end of the hollow air passage to be mixed with the compressed air. The compressed air and fuel are supplied to a fuel feeding passage connected to the inner end of the aforesaid hollow air passage to feed fuel to the cylinders in predetermined sequence as the piston carrier is rotated.

---

This invention relates to internal combustion engines generally. More particularly, this invention relates to an internal combustion engine having rotatable swinging pistons.

An object of this invention is to provide an improved internal combustion engine having rotatable pistons that are pivotally attached to a rotating cage, said pistons being connected by connecting rods to a hollow power transmitting unit which is mounted on a stationary eccentric, whereby as the pistons are caused to rotate by explosive mixture introduced into the cylinder cavities in sequence, the power transmitting unit is caused to rotate around said eccentric.

Another object of this invention is to provide an improved internal combustion engine with rotating swinging pistons which are pivotally mounted around the outer part of a rotating cage which is provided in the central part thereof with a power transmitting assembly that is connected by connecting rods to the pistons. The part of said cage between the pistons and the power transmitting assembly being hollow and one end thereof being provided with vanes which force air from the outside of engine into the hollow part of the cage. The other end of the hollow cage being connected to a duct leading to a fuel injection device so that air compressed by the vanes is forced to the fuel injection device which has a Venturi connected by another duct to a rotatable impeller which supplies fuel and air mixture through an intake to the cylinders in sequence as they are rotated past this intake port.

Another object of this invention is to provide an improved internal combustion engine having a configuration which lends itself to using multiples of such engines in a power unit.

Other and further objects of this invention will be apparent to those skilled in the art to which it relates from the following specification, claims and drawings in which, briefly:

FIG. 4a is a sectional view taken along the arc 4a—4a to show the locations of the intake and exhaust ports in relation to each other;

FIG. 8 is a schematic diagram showing the oil lubricating system of this engine.

Figure 1:
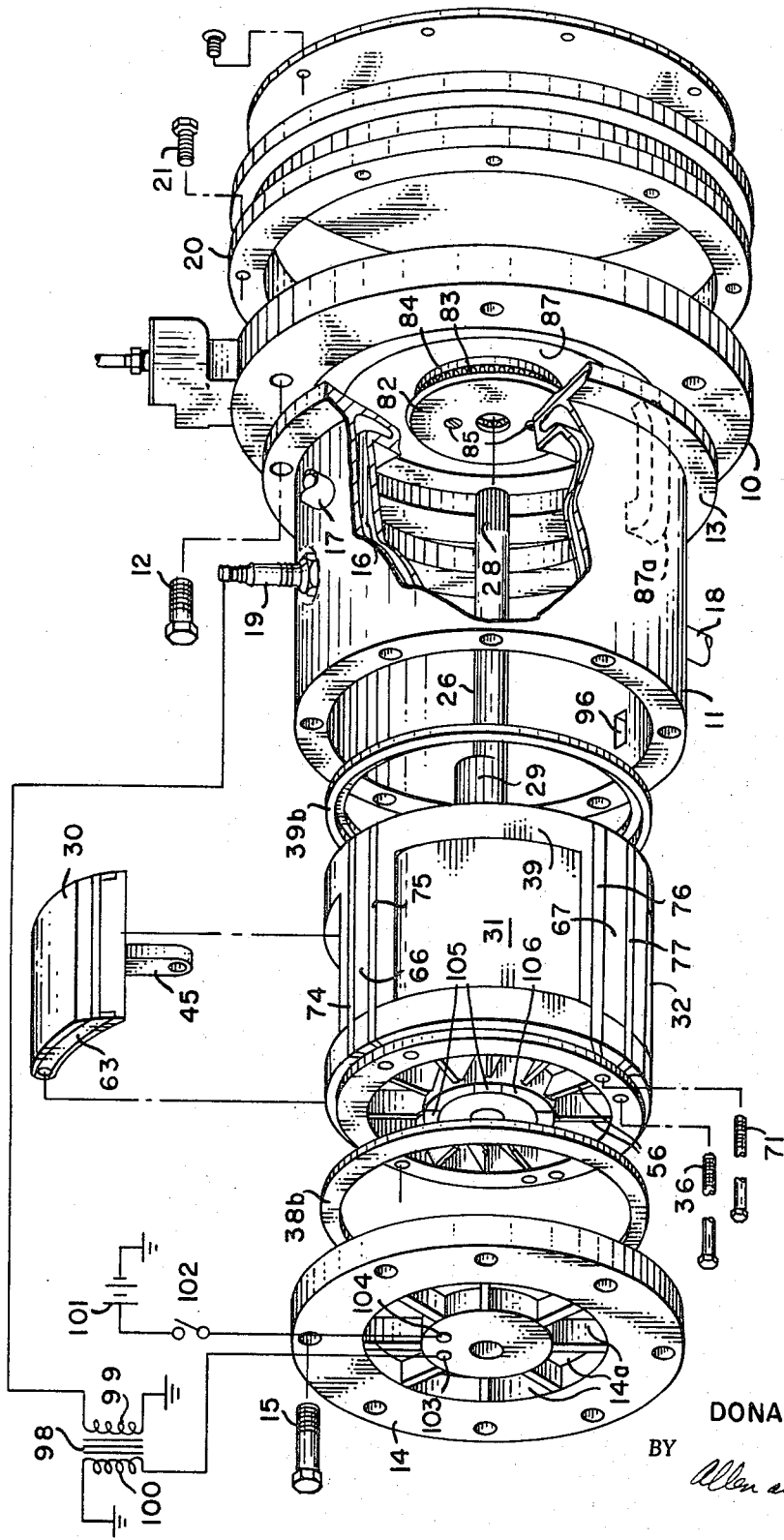
FIG. 1 is an exploded view of an engine of this invention.

Referring to the drawing in detail, reference numeral 10 designates a fixed plate to which the engine housing is attached. The housing 11 is provided with a flange 13 which abuts one side of the plate 10 and is attached thereto by a plurality of bolts 12. The other end of the housing 11 is provided with a plate 14 which is attached thereto by a plurality of bolts 15. The housing 11 is provided with water jackets 16 which have water inlet 17 and outlet 18 connected thereto so that cooling water or other liquid may be circulated through the water jackets. The housing 11 is also provided with a hole for receiving the threaded end of the spark plug 19 which is of conventional construction.

Another housing member 20 is attached to the other side of the plate 10 by a plurality of bolts 21. The cavity inside of housing 20 contains a quantity of lubricating oil which is circulated through the engine for lubricating the moving parts thereof, as shown in FIG. 8. The oil pump 22, which is of conventional gear-type construction, is supported in the supplementary housing 23 in the cavity of housing 20. The oil pump is driven by a gear 24 which meshes with the main drive gear 25.

The stationary shaft 26 is provided with splines 27 and 28 which fit into corresponding grooves formed in the central part of plate 14 and housing member 20, respectively, so that this shaft is held stationary and prevented from rotating. Shaft 26 is provided with an eccentric body 29 integral therewith.

Figure 2:
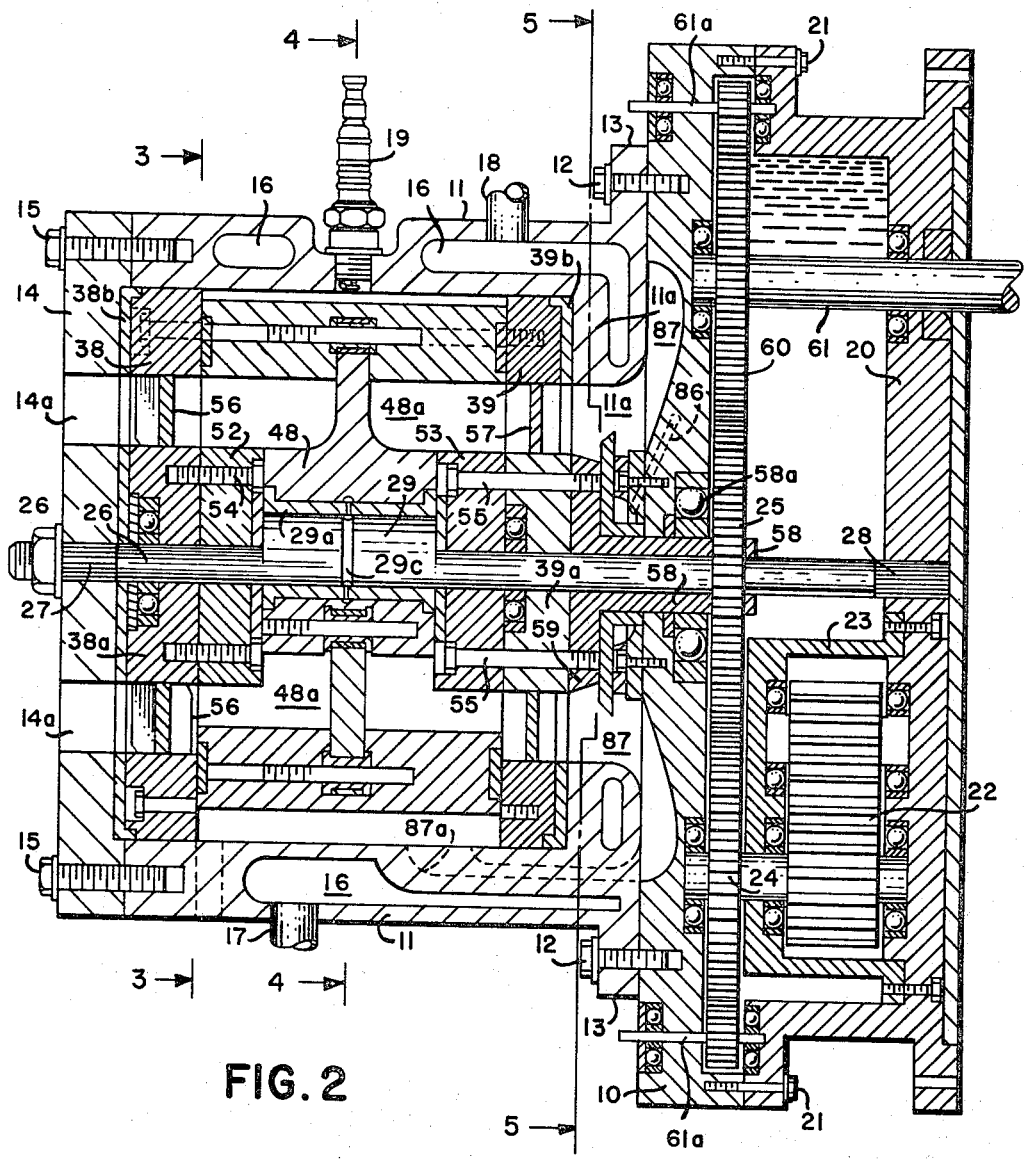
FIG. 2 is a longitudinal sectional view of the invention shown in FIG. 1.
Figure 3:
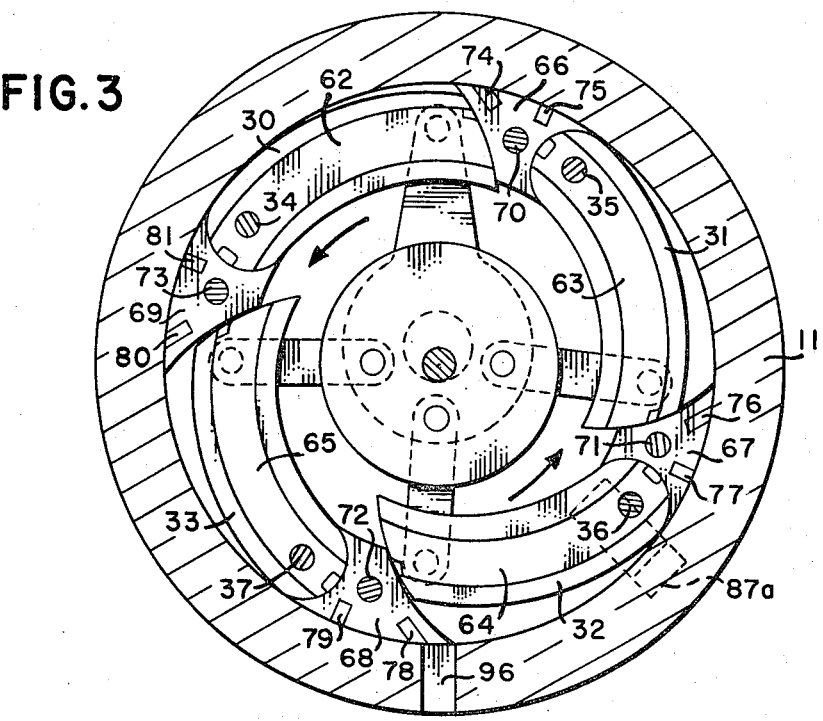
FIG. 3 is a sectional view taken along the line 3—3 of FIG. 2.
Figure 4:
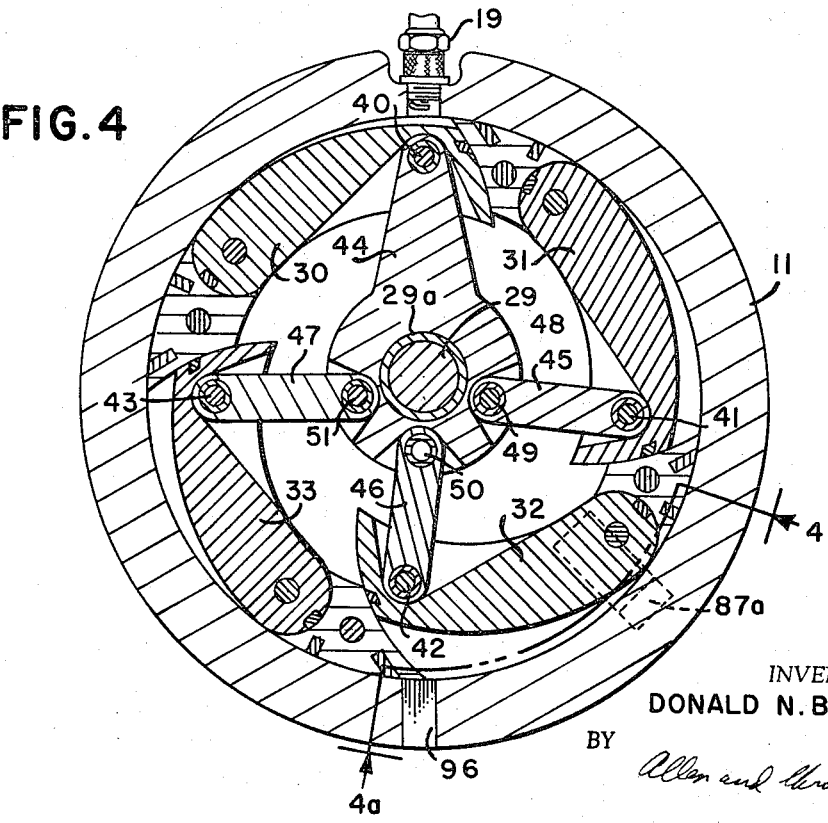
FIG. 4 is a sectional view taken along the line 4—4 of FIG. 2.
Figure 5:
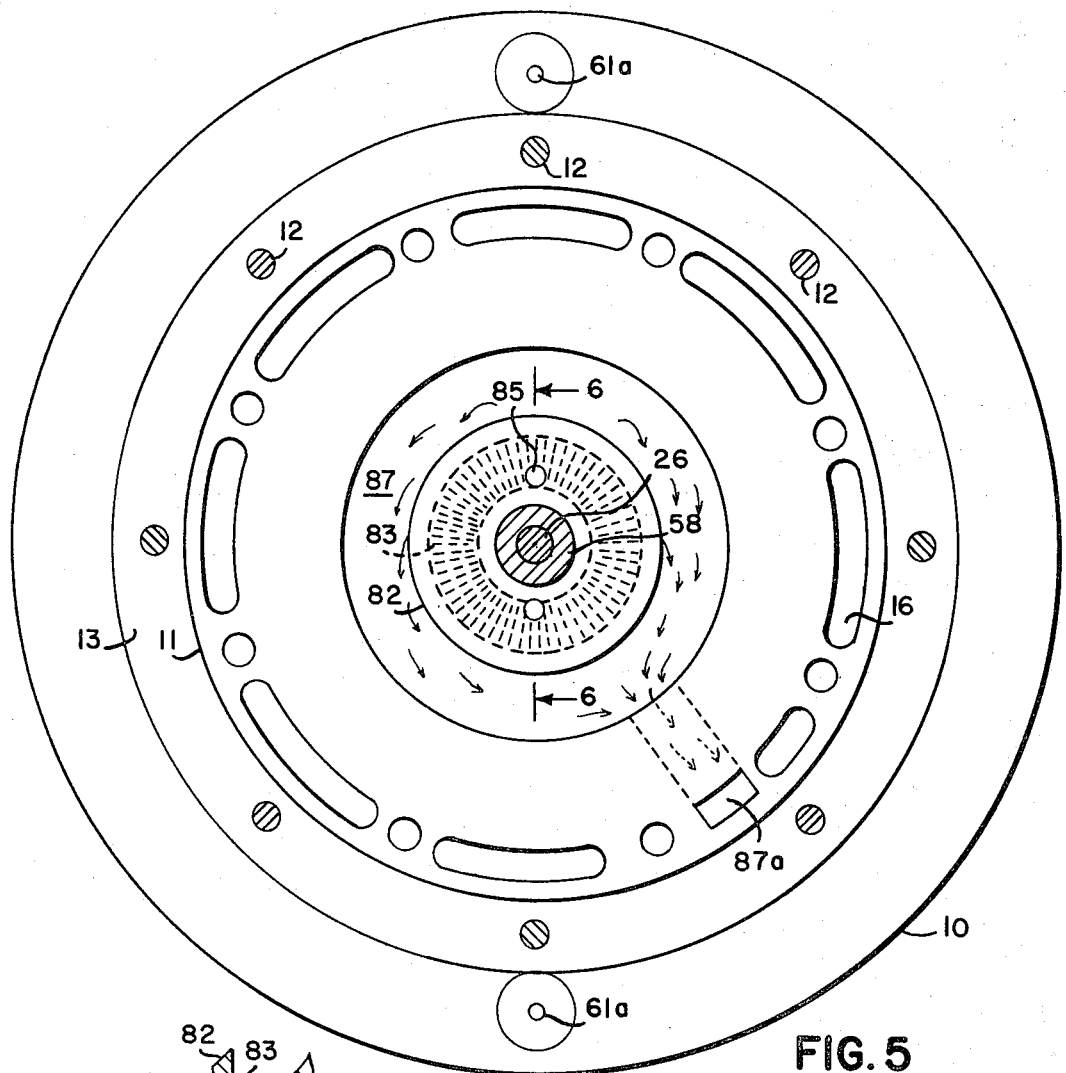
FIG. 5 is a sectional view taken along the line 5—5 of FIG. 2.

Four pistons 30, 31, 32 and 33 are provided to this engine, as shown in FIGS. 3 and 4. The pistons are pivotally supported by bolts 34, 35, 36 and 37, respectively, between the end plates 38 and 39 of the piston carrier shown in FIGS. 2, 3 and 4. The pistons are also connected by pivoting bolts 40, 41, 42 and 43, respectively, to the connecting rods 44, 45, 46 and 47, respectively. Each of these pivoting bolts is provided with a bearing sleeve, as shown in FIG. 4. Connecting rod 44 is integral with the member 48 which is mounted on the bearing sleeve 29a of eccentric 29, as shown in FIGS. 2 and 4. The other connecting rods 45, 46 and 47 are connected by pivoting bolts 49, 50 and 51, respectively, to the member 48.

Plates 52 and 53 are attached to inner surfaces of the end plates 38 and 39, respectively, of the piston carrier by bolts 54 and 55, respectively, to maintain the member 48 in proper alignment on the eccentric 29. Gas seal rings 38b and 39b are positioned between the piston carrier end plates 38 and 39 and the plate 14 and internal wall 11a, respectively, of the housing. These rings form wear-resistant shims that may be replaced after showing a certain amount of wear.

The end members 38 and 39 of the piston carrier are provided with radially exending vanes 56 and 57, respectively, which join the outer ring-shaped portions of these members with the central parts 38a and 39a, respectively. The vanes 56 are of fan-shape configuration and function to draw air through the holes 14a in end member 14 into the cavity 48a under the pistons where the air is compressed and forced past the vanes 57 in member 39 into cavity 87 formed in the end wall 11a of housing 11 and in plate 10.

The bolts 55 are long enough to extend through members 53, 39a and into flane 59 of the hollow shaft 58 which is supported on the plate 10 by a suitable bearing 58a. Bolts 55 are threaded into flange 59. The hollow shaft 58 surrounds a portion of the stationary shaft 26 which is concentric therewith. Gear 25 is keyed to the shaft 58 and meshes with gears 24 and 60. Gear 24 is employed for driving the oil pump 22 and gear 60 is attached by suitable key to shaft 61 which forms a power takeoff for the engine.

The opposite sides of the pistons 30, 31, 32 and 33 positioned adjacent the end members 38 and 39 of the piston carrier are provided with recesses for receiving seals such as the seals 62, 63, 64 and 65, respectively, shown in FIG. 3. Suitable leaf springs may be provided in these recesses for urging the seals outward into rubbing contact with the end members. Suitable bridging members 66, 67, 68 and 69 are provided which space the pistons between the end members 38 and 39 of the piston carrier. These bridging members are provided with holes for receiving the bolts 70, 71, 72 and 73, respectively, which pass through end member 38 and are threaded into end member 39 of the piston carrier for holding this carrier and the bridging members assembled.

Each of these bridging members is also provided with two longitudinally extending recesses for receiving sealing members which form seals with the inner surface of the housing 11, as shown in FIGS. 3 and 4. Bridging member 66 is provided with seal 74 adjacent the forward end of piston 30 and seal 75 adjacent the rear or pivoted end of piston 31, and bridging member 67 is provided with seal 76 which is positioned adjacent the forward end of piston 31 and seal 77 adjacent the rear or pivoted end of piston 32. Likewise bridging member 68 is provided with seal 78 adjacent the forward end of piston 32 and seal 79 adjacent the rear or pivoted end of piston 33, and bridging member 69 is provided with seal 80 adjacent the forward end of piston 33 and seal 81 adjacent the rear or pivoted end of piston 30.

Figure 6:
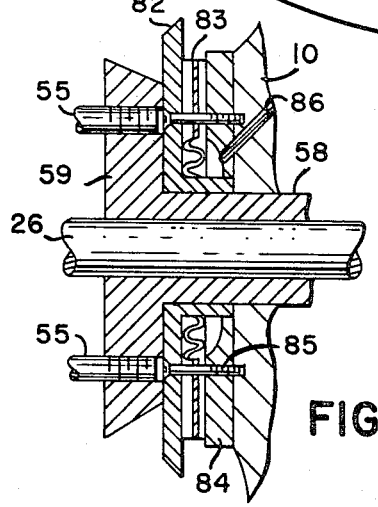
FIG. 6 is a sectional view taken along the line 6—6 of FIG. 5.
Figures 7, 7A:
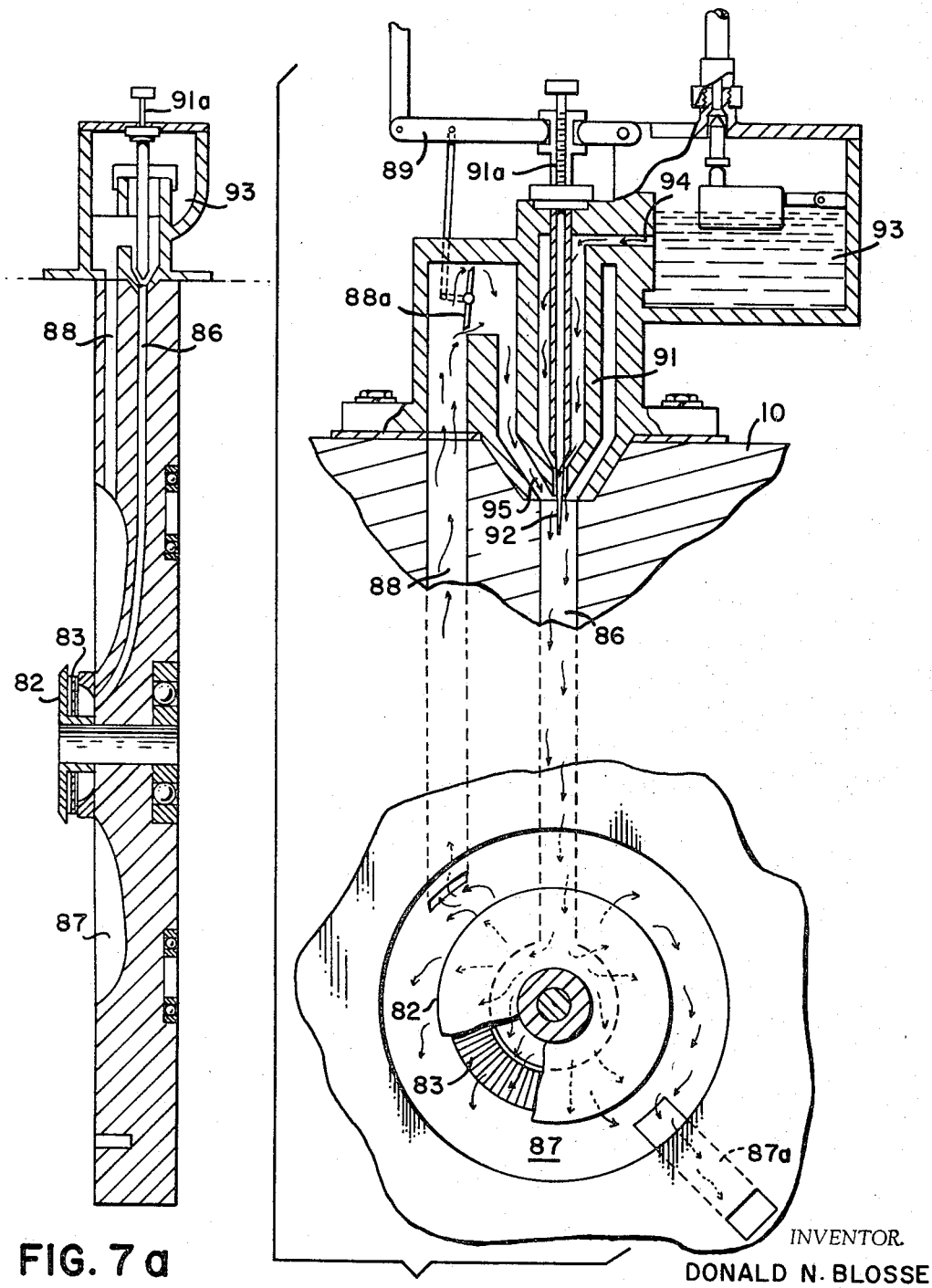
FIG. 7 is a detail view partially in section showing the fuel feeding system employed in this engine.
FIG. 7a is a vertical sectional view taken through the fixed end plate of the engine housing to show the fuel feeding passages.

Ring-shaped members 82 and 84, which are positioned around the hollow shaft 58, as shown, in FIG. 6, have a 360° fuel distribution wafer 83 of corrugated configuration sandwiched therebetween, and this assembly is attached to the plate 10 by the bolts 85. Plate 10 is also provided with a duct 86 connecting the cavity between members 82 and 83 with the fuel intake nozzle 95 which is attached to the outside of the plate 10 by suitable bolts, as shown in FIG. 7. The fuel feeding nozzle 95 is provided with an inner nozzle 91 that is controlled by the needle valve 92. Gasoline or other fuel is pumped into the reservoir 93 by a pump (not shown) and is fed through the passage 94 into the inner nozzle 91.

Plate 10 is also provided with a passage 88 which is connected to the compressed air cavity 87 formed in the end wall of the housing 11 and in the plate 10. Compressed air is fed into this passage 88 from cavity 87 and into the outer nozzle 95, the mouth of which surrounds the mouth of the inner nozzle 91. Thus, compressed air passing out of the outer nozzle sucks fuel from the inner nozzle into the passage 86 and through this passage to the cavity between plates 82 and 84 which is connected to the inlet or intake passage 87 leading to the intake passage 87a in the housing 11. The volume of compressed air fed to the nozzle 95 is controlled by the flap valve 88a which is pivotally mounted in the passage 88 and is actuated by lever 89. This lever also opens the needle valve 92 when it opens the flap valve 88a so that more fuel is fed through the inner nozzle 91.

The air and fuel mixture is fed to the fluted or corrugated vane 83 through passage 86 and is distributed to the cavity 87 where it is mixed with the compressed air. When the intake port to one of the cylinders is opened to receive a charge of fuel mixture, some of the compressed mixture in cavity 87 enters this cylinder through port 87a. At the same time, more fuel mixture is sucked into the cavity 87 from the distribution member 83 by the venturi action of the compressed air sweeping across the projecting member 82. This action causes the fuel mixture to be further mixed with the compressed air in cavity 87. Thus, the atmosphere in cavity 87 consists of compressed air laden with fuel. If desired, the inlet to the duct or passage 88 may be provided with a pipe extending into the cavity 87 and opening near the piston carrier so that air with less fuel mixed therewith is fed to the outer nozzle through duct 88.

This engine is also provided with an ignition system, as shown in FIG. 1. The ignition transformer 98 is provided with a secondary winding 99, one terminal of which is connected to the sparkplug 19 and the other terminal of which is grounded to the combustion engine housing so that high voltage ignition current is supplied to the sparkplug 19. The primary 100 of this transformer has one terminal thereof connected to one of the make and break contacts 103 that is supported on the central part of the end plate 14 by a suitable insulation bushing through which this contact extends to the other side of the end plate to make contact with the segments 105 which are supported by the insulation disk 106 on the end member 38a of the piston carrier. The other terminal of the primary winding 100 is grounded to the engine frame.

A source of current supply 101 is provided to the ignition system and one side of this current source is grounded to the combustion engine frame and the other side is connected through the switch 102 to the other contact 104 of the make and break contacts which is supported by a suitable insulation bushing on the end plate 14. Both contacts 103 and 104 extend through the end plate 14 and are insulated therefrom. When these contacts 103 and 104 engage a segment 105, the circuit between the current supply source 101 and the primary of the transformer 98 is established and a current pulse is sent through the primary winding 100. A high voltage is induced in the secondary winding 99 and this high voltage pulse is supplied to the spark plug 19 to fire the fuel mixture in the uppermost cylinder, shown in FIGS. 3 and 4, in which this mixture is under compression.

Firing this compressed mixture causes the piston carrier to be rotated on the eccentric 29 of the stationary shaft 26 in the counterclockwise direction. When the piston carrier is rotated so that the fired piston is in the position occupied by piston 33 in FIG. 3, the cylinder cavity is at its maximum expansion and another cylinder is positioned under the spark plug 19 with the fuel mixture therein compressed ready for firing. Further rotation of the piston carrier brings the first fired cylinder over the exhaust port 96 so that the fired gases are allowed to be exhausted through this port. As the exhaust port 96 is about to be closed by one of the bridging members of the piston carrier, the exhausted cylinder is moved over the intake port 87a to receive a fresh charge of firing fuel mixture. The intake port 87a is located diagonally across the cylinder from the exhaust port 96, as shown in FIG. 4a. Thus, the fuel mixture forced into the cylinder through the intake port 87a blows remnants of the fired mixture out of the cylinder into the exhaust port as this port is being closed. As the piston carrier is rotated further, the fresh charge of fuel mixture is compressed and this cylinder is brought into position under the sparkplug 19, ready for firing.

The contacts 103 and 104 are positioned so that, when these contacts are bridged by a segment 105 the sparkplug 19 is supplied with a firing high voltage pulse and the cylinder containing the compressed fuel mixture charge is fired. One segment 105 is provided for each cylinder and is positioned so that the corresponding cylinder is fired by closing of the circuit between contacts 103 and 104 when this cylinder is supplied with the fuel mixture and this mixture is compressed ready for firing.

It will be noted that the intake port 87a is positioned with respect to the exhaust port 96 such that a fuel mixture is supplied to one end of the cylinder as the remnants of the fired gas is being exhausted out of the other end of the cylinder, as shown in FIG. 4. Thus, while the piston 30 is in position for firing, piston 33 is in position of maximum cylinder cavity expansion. Piston 32 is positioned at the final stages of exhaust of the spent fuel gas and piston 31 is compressing the fuel charge in preparation for firing thereof.

In FIG. 8 there is shown a diagram which is a sectional view similar to FIG. 2 from which all cross-hatching has been eliminated so as not to obscure the oil flow passages and ducts which are shown in broken lines.

The cavity in the end housing 20 which is occupied by the various gears 24, 25, 60 and oil pump housing 23, is provided with a supply of oil which is fed under pressure by the oil pump 22 into the inlet 111 of the oil duct 110. The stationary shaft 26 is provided with an oil passage 112 bored therethrough which is connected to a duct 110 and also to the duct 114. The end member of the housing 20 is provided with an oil passage 113 that leads to bearings such as the bearing of shaft 61 positioned in this end plate. Oil passage 113 is connected to the passage 112 of the stationary shaft 26. Oil duct 114 is also connected to the passage 112 and to the passages 115 and 116 provided in the end plate 10.

Oil passage 115 feeds oil to bearings of shaft 61 and to the auxiliary power takeoff shafts 61a. Oil passage 115 also feeds oil to the central bearing 58a of the power takeoff shaft 58. The eccentric portion 29 of the stationary shaft 26 is provided with an oil passage 117 that extends to the groove 29c provided around the circumference of this eccentric member 29. Bearing 29a on the eccentric 29 is provided with a plurality of holes connecting the grooves 29c with the groove 44a provided internally in the member 44 so that oil flows from passages 112 to 117 into groove 29c and through the holes in member 29a into groove 44a. From groove 44a oil flows into passage 117a which extends through the connecting rod 44a to the pivot pin 40 in piston 30.

The other piston rods 45, 46 and 47 are lubricated from an oil supply passage 118, as shown in the case of piston rod 46, which is provided with an oil passage 118a extending through the length thereof so that both the inner pivot pin 50 and outer pivot pin 42 are lubricated with oil from this passage. The bearings around these pivot pins are provided with suitable grooves and holes so that oil may be fed from the passage 118 to passage 118a and from this latter passage around the bearing of pivot pin 50. Additional oil passages 119 extend through the vanes 56 of end member 38. Transverse oil passages 119a are provided around the outer parts of end member 38 of the piston carrier to supply oil to the rings 38b and the side seals 62, 63, 64 and 65 of the pistons from passages 117a and 118a via holes for the pivot pins 40 and 42. Additional passages may be provided through the various pistons connecting to the bearings for pivot pins 40, 41, 42 and 43 to supply oil to the side seals. Return oil passages 119a are connected to passages 119 which supply oil to the bearing in piston carrier end member 38. Oil passage 119 is connected to the return passage 121 in the stationary shaft 26. The other end member 39 of the piston carrier may be provided with several return passages 122 passing through vanes 57 if desired, and the outer ends of these passages may be connected to cross passages extending between the ring 39b and side members 62a and 64a which correspond to side members 62 and 64, respectively, in the other side of the piston carrier. Side member 63 and 64 also have corresponding side members in the other side of the piston carrier which are not shown. Return passage 121 in shaft 26 is provided with ports 121a in the housing 20 so that oil may be returned through these openings 121a into the oil cavity.

While I have shown a preferred embodiment of this invention, it will be understood that the invention is capable of variation and modification from the form shown so that the scope thereof should be limited only to the proper scope of the claims appended herewith.

What I claim is:

1. An internal combustion engine comprising the combination of a substantially circular housing having a detachable end plate at one end thereof, a rotatable piston carrier in said housing having a plurality of pistons pivotally attached thereto for swinging movement in cylinder cavities in said carrier, a stationary shaft fixedly attached to said housing, said shaft having an eccentric portion with respect to the axis of said rotatable piston carrier, said piston carrier being rotatably supported on said fixed shaft, a hollow member rotatably supported on the eccentric portion of said fixed shaft, piston rods connected to said pistons, said piston rods connecting said pistons to said hollow member, a hollow shaft positioned on said fixed shaft, means connecting said hollow shaft to said piston carrier, and power takeoff means connected to said hollow shaft.

2. An internal combustion engine comprising the combination as set forth in claim 1 further characterized in that said piston carrier is provided with a hollow air passage therethrough, means forcing air into said hollow air passage at one end thereof compressing said air at the other end of said passage, means feeding fuel into said other end of said passage, said last mentioned means including fuel intake means connected to said other end of said air passage and a passage in said housing connected selectively to said cylinder cavities as said piston carrier is rotated, said housing also having an exhaust port positioned such that the forward part of a selected cylinder cavity is opened to said fuel intake passage as said exhaust port is gradually closed at the rearward port of said selected cylinder cavity.

3. An internal combustion engine comprising the combination as set forth in claim 2 further characterized in that said housing comprises an auxiliary housing for containing an oil supply, an oil pump in said auxiliary housing, means connecting said oil pump to said hollow shaft for driving said pump, oil passage means in said fixed shaft connected to said pump, and additional oil passage means for distributing oil in the engine.

4. An internal combustion engine comprising the combination as set forth in claim 3 further characterized in that said hollow air passage is inside of said piston carrier so that the air forced into said hollow air passage contacts the inner surfaces of said pistons for cooling thereof as said pistons swing on the pivots thereof.

5. In an internal combustion engine comprising the combination as set forth in claim 2, further characterized in that said means feeding fuel into said other end of said passage comprises an annular member positioned in said other end of said passage, said annular member having radially extending recesses formed therein, means defining an annular cavity in said annular member, said fuel intake means comprising a passage connected to said annular cavity feeding fuel thereinto, said fuel passing outward through said recesses in said annular member and into said other end of said passage.

6. In an internal combustion engine comprising the combination as set forth in claim 5, further comprising a ring-shaped member adjacent said annular member and having the outer portions thereof projecting beyond said annular member into said other end of said passage to provide means drawing fuel through said radially extending recesses into said other end of said passage as compressed air flows past said projecting portions thereof.

References Cited

UNITED STATES PATENTS

| | | | |
|---|---|---|---|
| 1,202,828 | 10/1916 | Ginn | 123—17 |
| 1,549,015 | 8/1925 | McCarthy | 123—17 |
| 1,550,835 | 8/1925 | Morgan | 91—147 XR |
| 1,605,912 | 11/1926 | Barker | 123—17 |
| 1,715,490 | 6/1929 | Ballerstedt | 91—147 |
| 2,121,660 | 6/1938 | Hammers | 123—17 |

WENDELL E. BURNS, *Primary Examiner.*